(12) United States Patent
Furukawa et al.

(10) Patent No.: US 12,723,673 B2
(45) Date of Patent: Sep. 1, 2026

(54) VALVE AND VALVE ASSEMBLY METHOD

(71) Applicant: EAGLE INDUSTRY CO., LTD., Tokyo (JP)

(72) Inventors: Kenta Furukawa, Tokyo (JP); Naoki Nishimura, Tokyo (JP); Yu Deguchi, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 14 days.

(21) Appl. No.: 18/852,400

(22) PCT Filed: Mar. 28, 2023

(86) PCT No.: PCT/JP2023/012493

§ 371 (c)(1),
(2) Date: Sep. 27, 2024

(87) PCT Pub. No.: WO2023/195386

PCT Pub. Date: Oct. 12, 2023

(65) Prior Publication Data

US 2025/0215986 A1 Jul. 3, 2025

(30) Foreign Application Priority Data

Apr. 4, 2022 (JP) ................................ 2022-062563

(51) Int. Cl.
*F16K 27/04* (2006.01)
*F16K 11/07* (2006.01)
*F16K 31/06* (2006.01)

(52) U.S. Cl.
CPC ............ *F16K 27/041* (2013.01); *F16K 11/07* (2013.01); *F16K 31/0613* (2013.01);
(Continued)

(58) Field of Classification Search
CPC ..... Y10T 137/86614; Y10T 137/87217; Y10T 137/87209; Y10T 137/86622;
(Continued)

(56) References Cited

U.S. PATENT DOCUMENTS 4,581,978 A * 4/1986 Thebert ............... F15B 13/0431 91/464
4,616,900 A * 10/1986 Cairns .................. G02B 6/3847 385/73

(Continued)

FOREIGN PATENT DOCUMENTS

JP 2002-168359 A2 6/2002
JP 2002-327856 11/2002

(Continued)

OTHER PUBLICATIONS

International Search Report, Written Opinion and International Preliminary Report on Patentability issued in PCT/JP2023/012492, dated Jun. 20, 2023, 20 pages.

(Continued)

*Primary Examiner* — Matthew W Jellett
(74) *Attorney, Agent, or Firm* — HAYES SOLOWAY P.C.

(57) ABSTRACT

A valve includes: a casing; a valve body that is operable inside the casing; a biasing member that biases the valve body; and a retainer that holds the biasing member, wherein the retainer is provided with a flange portion caulked and fixed to the casing by a caulking end provided at one axial end of the casing, and wherein an elastic member is sandwiched between the flange portion and the casing to be axially elastically deformable.

11 Claims, 5 Drawing Sheets

(52) U.S. Cl.
CPC ................. *F16K 2200/3051* (2021.08); *Y10T 137/86614* (2015.04); *Y10T 137/86622* (2015.04); *Y10T 137/87209* (2015.04); *Y10T 137/87217* (2015.04)

(58) Field of Classification Search
CPC .... F16K 27/041; F16K 11/07; F16K 31/0613; F16K 27/048; F16K 2200/3051
USPC ............................................ 251/129.15, 365
See application file for complete search history.

(56) References Cited

U.S. PATENT DOCUMENTS 4,620,565 A * 11/1986 Brown .................. B60T 8/5037 303/119.2
4,635,683 A * 1/1987 Nielsen ................. H01F 7/1638 251/129.08
5,014,747 A * 5/1991 Suzuki ............... G05D 16/2013 137/625.65
5,076,326 A * 12/1991 McCabe ............. F16K 31/0606 137/625.65
5,141,448 A * 8/1992 Mattingly ................. F16F 1/32 439/314
5,184,644 A * 2/1993 Wade .................. F16H 61/0251 137/625.61
5,845,667 A * 12/1998 Najmolhoda ......... F16K 31/082 137/625.62
6,073,911 A * 6/2000 Reiter ................ F02M 51/0671 251/324
6,145,540 A * 11/2000 Linkner, Jr. ............ F16K 31/04 303/119.2
6,179,268 B1 * 1/2001 Seid ................... G05D 16/2024 335/229
6,688,334 B2 * 2/2004 Kawamura ......... F16K 31/0613 257/129
6,774,623 B2 * 8/2004 Palfenier ................ G01D 11/30 73/866.5
7,165,574 B2 * 1/2007 Ryuen ................. F16K 31/0665 137/596.17
7,213,612 B2 * 5/2007 Weiler, Jr. ............... B29C 49/00 91/464
8,382,064 B2 2/2013 Nisinosono et al.
8,418,724 B2 * 4/2013 Suzuki ................ F15B 13/0402 137/625.69
9,297,474 B2 * 3/2016 Suzuki ................ F16K 31/0675
9,494,237 B2 * 11/2016 Veiga ..................... F16J 15/186
10,302,208 B2 * 5/2019 Lamb ................... G05D 23/021
10,443,746 B2 * 10/2019 Okamura ............ F16K 11/0716
11,710,591 B2 * 7/2023 Lee ....................... F16K 27/029 251/129.15
2008/0257433 A1 * 10/2008 Tsujimoto ........... F16K 31/0613 251/35
2009/0057594 A1 3/2009 Tsujimoto

FOREIGN PATENT DOCUMENTS

| | | |
|---|---|---|
| JP | 2005-076687 | 3/2005 |
| JP | 2010-003447 | 1/2010 |
| JP | 2014-194969 | 10/2014 |
| JP | 2019-044843 | 3/2019 |
| JP | 2020-041686 | 3/2020 |
| JP | 2020-193637 | 12/2020 |
| WO | WO2010024282 | 3/2010 |

OTHER PUBLICATIONS

International Search Report, Written Opinion and International Preliminary Report on Patentability issued in PCT/JP2023/012493, dated Jun. 20, 2023, 20 pages.
U.S. Appl. No. 18/852,398, filed Sep. 27, 2024.
U.S. Appl. No. 18/852,400, filed Sep. 27, 2024.
U.S. Appl. No. 18/852,400, filed Sep. 27, 2024, Furukawa et al.
U.S. Appl. No. 18/852,398, filed Sep. 27, 2024, Furukawa et al.

* cited by examiner 21
23d
21c
200"
23
23e
23a
23b
21b (b)

21e
23h
21c
21b
23d
21
23d
21c
200"
23
23e
23a
23b
21b 21
23d
21c
23b
29
22
23
23e
23a
200′
21b
L2

(b)

VALVE AND VALVE ASSEMBLY METHOD

TECHNICAL FIELD

The present invention relates to a valve and a valve assembly method, for example, a valve for controlling a hydraulic fluid and a method of assembling the valve.

BACKGROUND ART

A valve that is used to control a hydraulic fluid in various industrial fields includes a valve seat and a valve body movable close to and away from the valve seat and can control the pressure or flow rate of the hydraulic fluid by adjusting a valve opening degree.

As such a valve, a spool valve in which a spool corresponding to a valve body moves in parallel to an opening corresponding to a valve seat, a butterfly valve of which a valve body has a rotation axis, or a lift valve of which a valve body moves perpendicular to an opening corresponding to a valve seat is typically exemplified. Among these valves, the spool valve has high spool responsiveness to a driving force since a spool movement direction intersects a hydraulic fluid flow direction and a fluid pressure of a hydraulic fluid is less likely to act in the spool movement direction.

As the spool valve, for example, a solenoid valve of Patent Citation 1 is known. The solenoid valve of Patent Citation 1 mainly includes a columnar spool which is accommodated in a sleeve, a solenoid portion which is fixed to one end of the sleeve and drives the spool, a retainer which is fixed to the other end of the sleeve, and a biasing means which is held between the spool and the retainer.

The retainer has a cylindrical shape with a bottom that opens on the sleeve side, and a flange extending radially outward is formed at a sleeve side end. Further, a caulking piece extending from an end surface of the sleeve toward the retainer is formed around the entire circumference on the outer edge of the end of the sleeve on the retainer side. By bending the caulking piece radially inward while disposing the flange of the retainer on the inner radial side of the caulking piece, the flange is axially sandwiched between the caulking piece and the end surface of the sleeve and hence the retainer can be firmly fixed to the end of the sleeve.

CITATION LIST

Patent Literature

Patent Citation 1: WO 2010/024282 A (PAGE 7, FIG. 2B)

SUMMARY OF INVENTION

Technical Problem

In the solenoid valve of Patent Citation 1, since the flange is axially sandwiched between the caulking piece and the end surface of the sleeve with its surface in contact with the end surface of the sleeve, the retainer and the sleeve can be strongly and simply fixed. However, in such a solenoid valve, the caulking piece may be deformed due to aging. As a result, there is a risk that a gap may be formed between the caulking piece and the flange and rattling may occur between the retainer and the sleeve.

The present invention has been made in view of such problems and an object of the present invention is to provide a valve and a method of assembling the valve that can maintain a stable fixed state between a retainer and a casing for a long period of time.

Solution to Problem

In order to solve the foregoing problem, according to a first aspect of the present invention, there is provided a valve including: a casing; a valve body that is operable inside the casing; a biasing member that biases the valve body; and a retainer that holds the biasing member, wherein the retainer is provided with a flange portion caulked and fixed to the casing by a caulking end provided at one axial end of the casing, and wherein an elastic member is sandwiched between the flange portion and the casing to be axially elastically deformable. According to the aforesaid feature of the first aspect of the present invention, since the elastic member is sandwiched between the casing and the flange portion of the retainer, the flange portion and the caulking end are maintained in a contact state due to the elastic restoring force of the elastic member even when the caulking end is deformed due to aging and hence the casing and the retainer do not rattle.

It may be preferable that the elastic member is disposed between the flange portion and an end surface of the casing facing the caulking end. According to this preferable configuration, the elastic restoring force of the elastic member can stably act on the caulking end through the flange portion.

It may be preferable that a surface of the flange portion facing the end surface of the casing is an annular flat surface. According to this preferable configuration, the elastic member can be stably sandwiched between the end surface of the casing and the facing surface of the flange portion.

It may be preferable that the elastic member is formed in an annular shape. According to this preferable configuration, the elastic member is continuous in the circumferential direction without interruption and a strong elastic restoring force from the elastic member acts almost uniformly in the circumferential direction. Therefore, the relative inclination between the retainer and the casing can be suppressed.

It may be preferable that the elastic member is a wave washer. According to this preferable configuration, since the wave washer comes into contact with the casing at a plurality of positions in the circumferential direction, the elastic restoring force can suitably act substantially uniformly in the circumferential direction of the retainer. Therefore, the relative inclination of the retainer and the casing can be further suppressed.

It may be preferable that an inner peripheral surface of the caulking end is provided with a regulation surface that regulates the radial movement of the flange portion. According to this preferable configuration, the inclination and radial deviation of the retainer can be regulated.

According to a second aspect of the present invention, there is provided a method of assembling a valve including a casing, a valve body operable inside the casing, a biasing member that biases the valve body, and a retainer that holds the biasing member, wherein the retainer is provide with a flange portion caulked and fixed to the casing by a caulking end provided at one axial end of the casing, and the method comprises a step of locking the caulking end to the flange portion while an elastic member disposed between the flange portion and the casing is axially compressed. According to the features of second aspect of the present invention, since the elastic member is sandwiched between the casing and the flange portion of the retainer, the flange portion and the caulking end are maintained in a contact state due to the elastic restoring force of the elastic member even when the caulking end is deformed due to aging and hence the casing and the retainer do not rattle.

BRIEF DESCRIPTION OF DRAWINGS

FIG. 5B is a schematic view illustrating a state in which the spring is further compressed from the state of FIG. 5A.

DESCRIPTION OF EMBODIMENTS

A mode for carrying out a valve according to the present invention will be described on the basis of the embodiment. Furthermore, although the embodiment will be described by using a solenoid valve as an example, it is also applicable to other uses.

Embodiment

A solenoid valve as a valve according to an embodiment of the present invention will be described with reference to FIGS. 1 to 5. Hereinafter, a description will be made assuming that the right side of the paper of FIG. 1 is one axial end side of the solenoid valve and the left side of the paper of FIG. 1 is the other axial end side of the solenoid valve.

Figure 1:
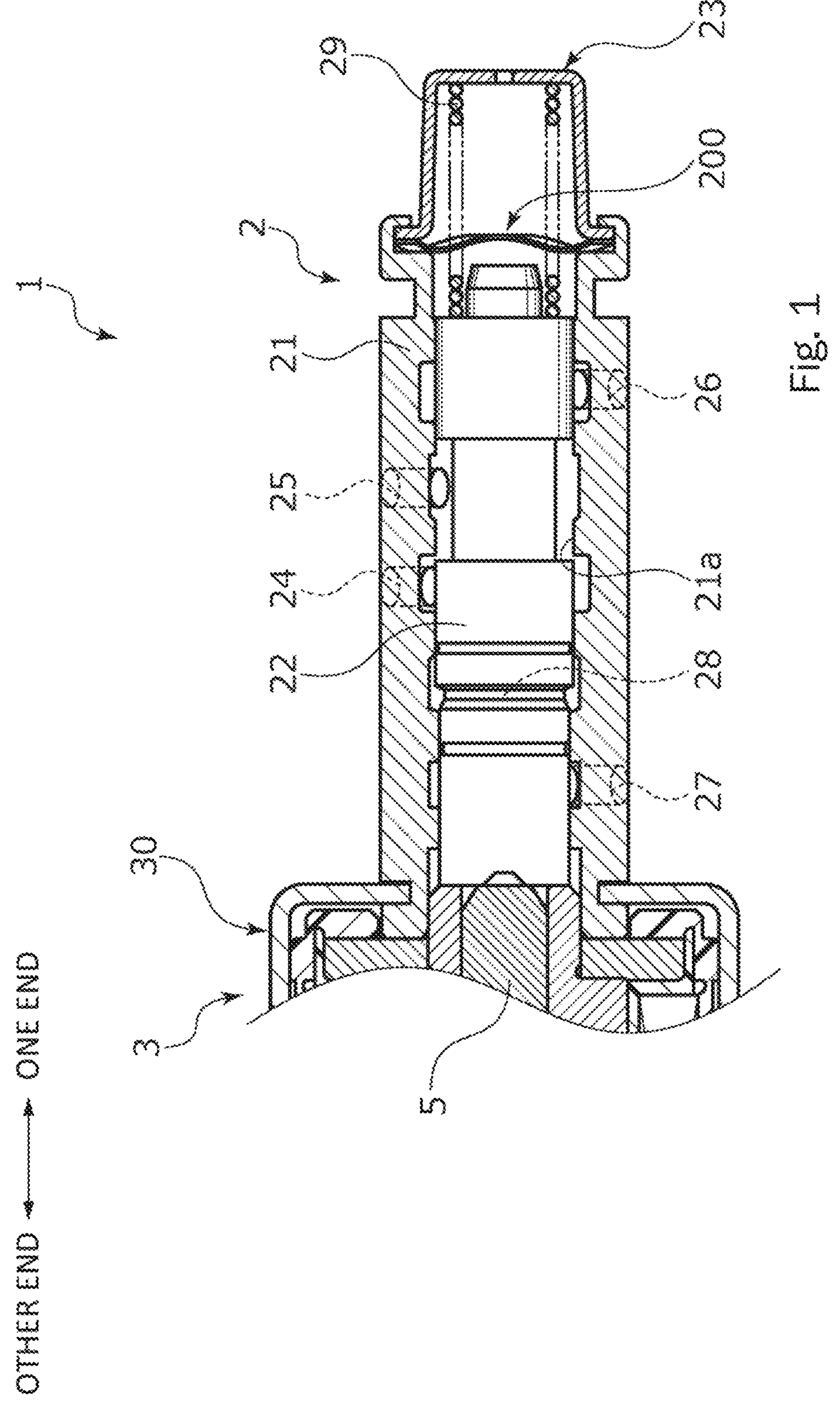
FIG. 1 is a side sectional view illustrating a solenoid valve as a valve according to an embodiment of the present invention.

As illustrated in FIG. 1, a solenoid valve 1 of this embodiment is a spool type solenoid valve, and is used in a device controlled by hydraulic pressure, such as an automatic transmission of a vehicle. Furthermore, the solenoid valve 1 is used by being attached to a mounting hole in a valve housing on the device side.

The solenoid valve 1 includes a valve portion 2 that adjusts the flow rate of fluid, that is, a control fluid such as hydraulic oil, and is integrally attached to a solenoid portion 3. Furthermore, FIG. 1 illustrates the solenoid valve 1 in an off state in which the coil of the solenoid portion 3 is not energized.

First, the structure of the solenoid portion 3 will be schematically described. In the solenoid portion 3, a coil, a stator, a yoke, a movable core, and the like are accommodated in a cylindrical solenoid casing 30. When the solenoid valve 1 is in an off state, a spool 22 is biased toward the other axial end by a biasing force of a spring 29 (see FIG. 1.) and the spool 22 and a rod 5 move toward the other axial end in accordance with this biasing.

Further, when the solenoid valve 1 is in an on state, a magnetic circuit is formed in the solenoid portion 3 by energizing the coil and a magnetic force is generated between the stator and the movable core, so that the movable core and the rod 5 move toward one axial end in the axial direction. Accordingly, the spool 22 moves toward one axial end to compress the spring 29 (not illustrated).

Next, the structure of the valve portion 2 will be described. As illustrated in FIG. 1, the valve portion 2 mainly includes a sleeve 21 which serves as a casing, a spool 22 which serves as a valve body, a spring 29 which serves as a biasing member, a retainer 23, and a wave washer 200 which serves as an elastic member.

The sleeve 21 is provided with openings for various ports such as an input port 24, an output port 25, a discharge port 26, a drain port 27, and a feedback port 28, which are connected to the flow path provided in the mounting hole of the valve housing.

The spool 22 is fluid-tightly accommodated in a through hole 21*a* formed in the axial direction on the inner radial side of the sleeve 21.

The spool 22 is capable of reciprocating in the axial direction, and when the spool 22 is reciprocated in the axial direction, the communication state of various ports is changed, and the pressure and flow rate of the hydraulic oil are controlled. Furthermore, the sleeve 21 and the spool 22 are made of materials such as aluminum, iron, stainless steel, and resin.

The spring 29 is a coil spring, and biases the spool 22 toward the other axial end. Further, one axial end of the spring 29 is held by the retainer 23.

Figure 2:
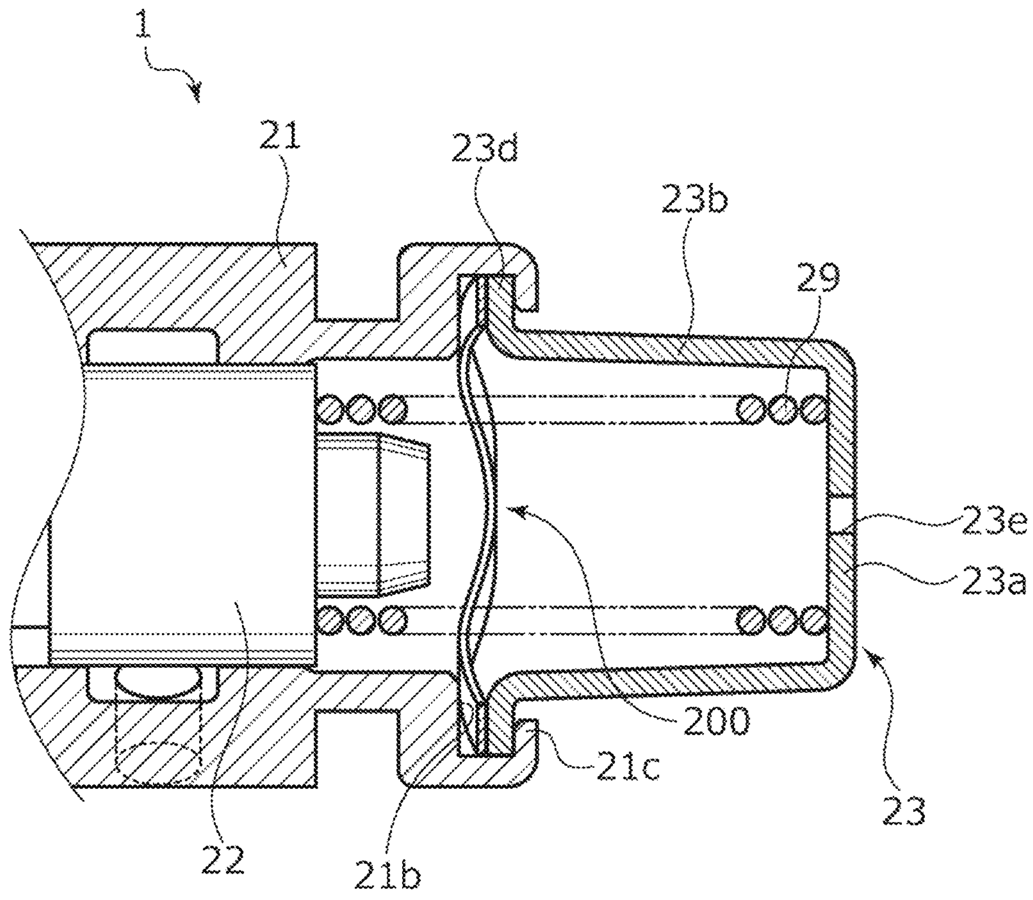
FIG. 2 is an enlarged view of a main part of FIG. 1.

As illustrated in FIG. 2, the retainer 23 has a cylindrical shape with a bottom. Specifically, the retainer 23 includes a disc-shaped bottom portion 23*a* which serves as a seat surface, a cylindrical side wall portion 23*b* which serves as a cylindrical portion extending from the outer edge of the bottom portion 23*a* toward the other axial end, and an annular flange portion 23*d* which extends radially outward from the other axial end of the side wall portion 23*b*.

The retainer 23 is formed by pressing a thin plate made of a plastically deformable material such as aluminum, iron, or stainless steel, preferably a metal.

One through-hole 23*e* is provided at the center of the bottom portion 23*a*.

The side wall portion 23*b* extends from the outer edge of the bottom portion 23*a* toward the other axial end while being slightly expanded in diameter.

The flange portion 23*d* is bent radially outward from the other axial end of the side wall portion 23*b* and extends substantially in parallel to the bottom portion 23*a*.

The retainer 23 configured in this way is fixed to the sleeve 21 by caulking a caulking piece 21*c* serving as a caulking end extending from an outer edge of an end surface 21*b* toward one axial end side to the inner radial side while disposing the flange portion 23*d* on the end surface 21*b* on one axial end side of the sleeve 21 through the wave washer 200 (see FIG. 2).

Figure 3:
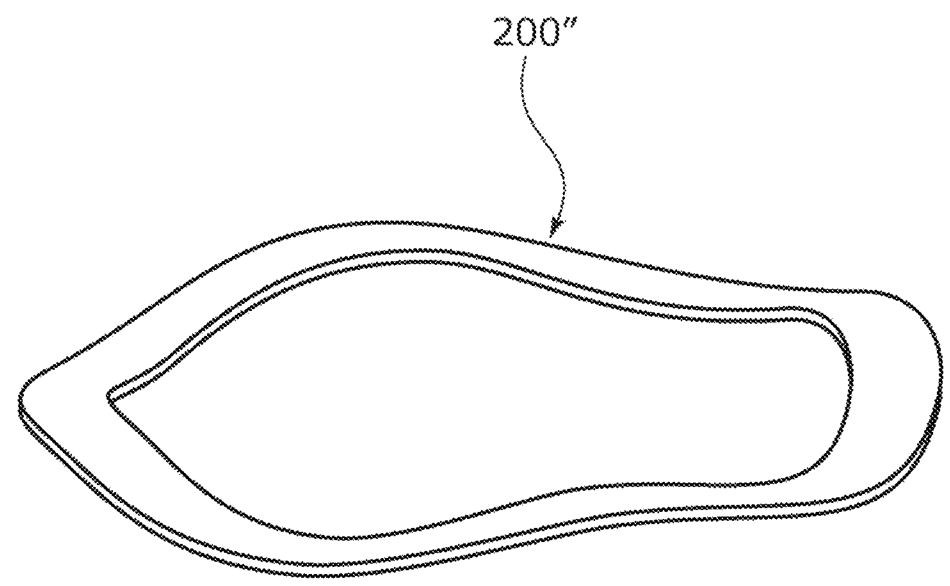
FIG. 3 is a perspective view illustrating a shape of a wave washer.

As illustrated in FIG. 3, a wave washer 200" is a thin annular metal plate that is bent in a wave shape in the circumferential direction to apply a spring force. Since this wave washer 200" has four peaks and valleys in the circumferential direction, the wave washer can receive an axial load uniformly in the circumferential direction. Furthermore, FIG. 3 illustrates the wave washer 200" in a natural state without being compressed. Furthermore, the number of peaks and valleys of the wave washer 200" may be freely changed.

The spring constant of the wave washer 200" of this embodiment is larger than the spring constant of the spring 29.

Figure 4:
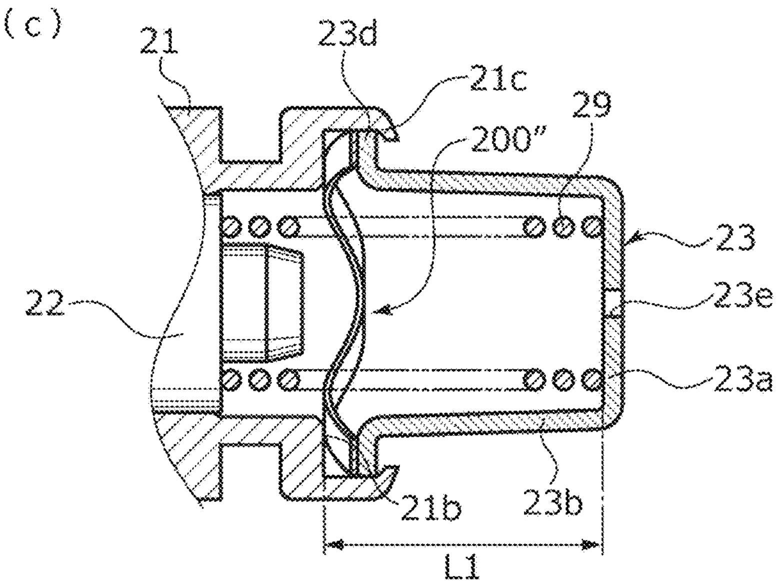
FIG. 4A is a schematic view illustrating a state in which the wave washer and a retainer are arranged at one end of a sleeve.
FIG. 4B is a schematic view illustrating a state in which the wave washer and the retainer are temporarily fixed to one end of the sleeve from the state of FIG. 4A.
FIG. 4C is a schematic view illustrating a state in which a spring and a spool are assembled from the state of FIG. 4B.

Next, a method of assembling the solenoid valve 1 will be described with reference to FIGS. 4 and 5.

First, as illustrated in FIG. 4A, the wave washer 200" and the retainer 23 are arranged at one axial end of the sleeve 21. At this time, the wave washer 200" is disposed to be sandwiched between the end surface 21*b* of the sleeve 21 and the other end surface 23*h* of the flange portion 23*d* of the retainer 23 (see FIG. 4B.).

Next, as illustrated in FIG. 4B, the retainer 23 and the wave washer 200" are temporarily fixed to the sleeve 21 by bending the caulking piece 21*c*, extending from the outer edge of the end surface 21*b* of the sleeve 21 toward one axial end side, toward the inner radial side.

A plurality of the caulking pieces 21*c* are provided in the circumferential direction. Specifically, since the outer edge of the end surface 21*b* is provided in an arc shape except for a part in the circumferential direction, the bending stress can be released to the part divided in the circumferential direction when bending the caulking piece 21*c* radially inward. Furthermore, the caulking piece 21*c* may have one annular shape in the circumferential direction or may have one C-shape in the circumferential direction.

Since the other end surface 23*h* of the flange portion 23*d* and the end surface 21*b* of the sleeve 21 are annular flat surfaces that extend orthogonally to the axial direction, the wave washer 200" can be stably sandwiched between the other end surface 23*h* of the flange portion 23*d* and the end surface 21*b* of the sleeve 21.

Further, the inner peripheral surface 21*e* of the portion on the other axial end side than the bent portion of each caulking piece 21*c* regulates the radial movement and inclination of the flange portion 23*d* and the wave washer 200" and allows the axial movement thereof. That is, the inner peripheral surface 21*e* of the caulking piece 21*c* functions as a regulation surface that regulates the movement of the flange portion 23*d* in the radial direction.

Furthermore, when the retainer 23 is temporarily fixed to the sleeve 21, the caulking piece 21*c* comes into contact with only the outer edge of flange portion 23*d* of the retainer 23 and almost no force is applied to press the flange portion 23*d* toward the other axial end side. Thus, the wave washer 200" is in a natural state without compressing.

Next, after the spring 29 and the spool 22 are inserted from the other axial end of the sleeve 21, the solenoid portion 3 is fixed to the other axial end of the sleeve 21 (that is, the state illustrated in FIG. 4C.). The spring 29 passes through the wave washer 200" and one axial end of the spring 29 is adapted to abut and be received by the bottom portion 23*a* of the retainer 23.

Furthermore, at this time, the axial dimension between the end surface 21*b* of the sleeve 21 and the other end surface of the bottom portion 23*a* of the retainer 23 is L1.

Figure 5A:
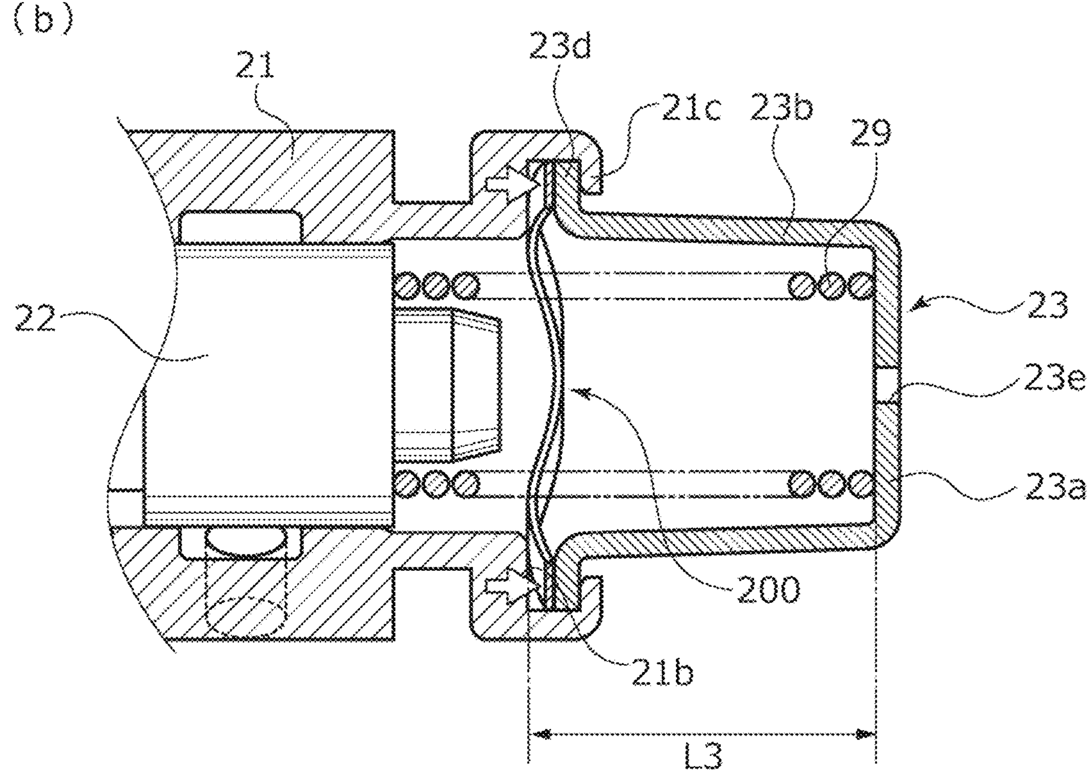
FIG. 5A is a schematic view illustrating a state in which the spring is compressed from the state of FIG. 4C

Next, as illustrated in FIG. 5A, the caulking piece 21*c* is pressed toward the other axial end by a jig (not illustrated) to adjust the biasing force of the spring 29 (see black arrow). Furthermore, at this time, the biasing force of the spring 29 is adjusted while directly or indirectly monitoring the biasing force of the spring 29 using a sensor.

Since the retainer 23 is pressed by the caulking piece 21*c* toward the other axial end side, the wave washer 200" is compressed in the axial direction to be the wave washer 200' (200"→200'). Accordingly, the bottom portion 23*a* of the retainer 23 approaches the end surface 21*b* of the sleeve 21 in the axial direction.

Accordingly, the axial dimension L2 between the end surface 21*b* of the sleeve 21 and the other end surface of the bottom portion 23*a* of the retainer 23 is shorter than the axial dimension L1 of FIG. 4C (L1>L2).

As illustrated in FIG. 5B, the caulking piece 21*c* is further pressed toward the other axial end side by a jig (not illustrated) so that the bottom portion 23*a* further approaches the end surface 21*b* of the sleeve 21 in the axial direction.

In other words, the axial dimension L3 between the end surface 21*b* of the sleeve 21 and the other end surface of the bottom portion 23*a* of the retainer 23 is shorter than the axial dimension L2 of FIG. 5A (L2>L3). The axial dimension L3 is a dimension in which the biasing force of the spring 29 is appropriate.

Furthermore, the wave washer 200' is further compressed in the axial direction to be the wave washer 200 (200'→200).

Thereafter, assembly of the solenoid valve 1 is completed with the biasing force of the spring 29 in an appropriate state by removing the jig (not illustrated).

In this state, the wave washer 200 tries to be elastically restored, but since the wave washer 200 is locked to the plastically deformed caulking piece 21*c*, the wave washer 200 remains compressed in the axial direction. That is, an elastic restoring force (see white arrow) of the wave washer 200 acts between the end surface 21*b* of the sleeve 21 and the caulking piece 21*c*.

Further, since the through-hole 23*e* is provided in the bottom portion 23*a* of the retainer 23 and the through-hole 23*e* can be used as a breathing hole to allow hydraulic oil to flow, the spool 22 can be operated smoothly when the solenoid valve 1 is used.

As described above, since the caulking piece 21*c* is locked to the flange portion 23*d* while the wave washer 200 is elastically deformed in the compressing direction, the biasing force of the spring 29 can be adjusted with high accuracy.

Further, since the elastic restoring force of the wave washer 200 acts between the flange portion 23*d* of the retainer 23 and the end surface 21*b* of the sleeve 21, the flange portion 23*d* and the caulking piece 21*c* are maintained in a contact state due to the elastic restoring force of the wave washer 200 even when the caulking piece 21*c* is deformed, for example, in the opening direction due to aging and hence the sleeve 21 and the retainer 23 do not rattle.

Furthermore, although the retainer is also elastically restored, the restoring amount is extremely small compared to the elastic restoring amount of the wave washer and hence a description thereof will be omitted.

Further, since the wave washer 200 is disposed between the flange portion 23*d* of the retainer 23 and the end surface 21*b* of the sleeve 21, the elastic restoring force of the wave washer 200 can be stably applied to the caulking piece 21*c* through the flange portion 23*d*.

Further, since the other end surface 23*h* of the flange portion 23*d* and the end surface 21*b* of the sleeve 21 are annular flat surfaces extending orthogonally to the axial direction, the wave washer 200 can be stably sandwiched between the other end surface 23*h* of the flange portion 23*d* and the end surface 21*b* of the sleeve 21.

Further, the wave washer 200 is formed in an annular shape. In other words, the wave washer 200 is continuous in the circumferential direction without interruption and a strong elastic restoring force from the wave washer 200 suitably acts over the entire circumference of the flange portion 23*d*.

Further, since the plurality of peaks of the wave washer 200 come into contact with the flange portion 23*d* and the plurality of valleys of the wave washer 200 come into contact with the end surface 21*b* of the sleeve 21, the elastic restoring force of the wave washer 200 can suitably act substantially uniformly in the circumferential direction of the retainer 23. Therefore, the relative inclination of the retainer 23 and the wave washer 200 can be suppressed.

Further, since the plate thickness of the wave washer 200 is smaller than the caulking piece 21*c* and the flange portion 23*d*, the elastic restoring force of the wave washer 200 can be adjusted satisfactorily.

Further, since the width corresponding to the radial length of the wave washer 200 is substantially the same as the radial length of the end surface 21*b* of the sleeve 21 and the flange portion 23*d*, the elastic restoring force of the wave washer 200 can be adjusted with a simple structure. Furthermore, although the width corresponding to the radial length of the wave washer 200 can be freely changed, the width is preferably 0.5 to 2 times the radial length of the end surface 21*b* of the sleeve 21 and the flange portion 23*d*.

Further, the inner peripheral surface 21*e* of the caulking piece 21*c* can regulate the inclination and radial deviation of the retainer 23 relative to the sleeve 21. Further, since the inner peripheral surface 21*e* allows the axial movement of the flange portion 23*d*, the retainer 23 can be stably moved in the axial direction and the biasing force of the spring 29 can be adjusted with high accuracy.

Further, since the spring constant of the wave washer 200 disposed at a position overlapping the caulking piece 21*c* in the axial direction is larger than the spring constant of the spring 29 disposed at a position radially offset from the caulking piece 21*c*, the inclination of the retainer 23 can be regulated even when the spring 29 is slightly inclined.

Although the embodiment of the present invention has been described above with reference to the drawings, the specific configuration is not limited to these examples, and any changes or additions that do not depart from the scope of the present invention are included in the present invention.

For example, in the above-described embodiment, although it has been described that the elastic member is sandwiched between the flange portion of the retainer and the end surface of the casing, the elastic member may be sandwiched between the flange portion and the caulking end. Also in this case, the casing and the retainer can be maintained in a fixed state due to the elastic restoring force of the elastic member.

Further, in the above-described embodiment, although it has been described that the elastic member has an annular shape, the present invention is not limited thereto, and the elastic member that is axially elastically deformable may be provided at a plurality of positions in the circumferential direction.

Further, in the above-described embodiment, although it has been described that the elastic member is the metallic wave washer, for example, the elastic member may be made of rubber or synthetic resin.

Further, in the above-described embodiment, although it has been described that the elastic member is separated from the flange portion of the retainer and the casing, the elastic member may be fixed to the flange portion or the end surface of the casing.

Further, in the above-described embodiment, although it has been described that the retainer 23 is made of a plastically deformable metal thin plate, the present invention is not limited thereto, and the material can be freely changed.

Further, in the above-described embodiment, although it has been described that the biasing member is a compression spring, the biasing member may be a tension spring.

Further, in the above-described embodiment, although a spool type valve that uses a spool as a valve body has been described, the present invention is not limited thereto, and a globe valve, a gate valve, or the like may be used.

REFERENCE SIGNS LIST

1 Solenoid valve (valve)
21 Sleeve (casing)
21*b* End surface
21*c* Caulking piece (caulking end)
21*e* Inner peripheral surface (guide surface)
22 Spool (valve body)
23 Retainer
23*a* Bottom portion (seat surface)
23*b* Side wall portion (cylindrical portion)
23*d* Flange portion
23*h* Other end surface (facing surface)
29 Spring (biasing member)
200 Wave washer (elastic member)

The invention claimed is:

1. A valve, comprising:
a casing;
a valve body that is operable inside the casing;
a biasing member that biases the valve body; and
a retainer that holds the biasing member,
wherein the retainer is provided with a flange portion fixed to the casing by a bending piece provided at one axial end of the casing, and
wherein an elastic member is sandwiched between the flange portion and the casing to be axially elastically deformable, and
wherein the bending piece is formed by bending inward-radially, toward the flange portion, a protruding portion which protrudes in an axial direction from an axial end surface of the casing brought into contact with the biasing member.

2. The valve according to claim 1,
wherein the elastic member is disposed between the flange portion and an end surface of the casing facing the caulking end.

3. The valve according to claim 2,
wherein a surface of the flange portion facing the end surface of the casing is an annular flat surface.

4. The valve according to claim 1,
wherein the elastic member is formed in an annular shape.

5. The valve according to claim 4,
wherein the elastic member is a wave washer.

6. The valve according to claim 1,
wherein an inner peripheral surface of the caulking end is provided with a regulation surface that regulates the radial movement of the flange portion.

7. A method of assembling a valve including a casing, a valve body operable inside the casing, a biasing member that biases the valve body, and a retainer that holds the biasing member,
wherein the retainer is provided with a flange portion fixed to the casing by a bending piece provided at one axial end of the casing, and
the method comprises a step of
forming the bending piece by bending inward-radially, toward the flange portion, a protruding portion which protrudes in an axial direction from an axial end surface of the casing brought into contact with the biasing member while an elastic member disposed between the flange portion and the casing is axially compressed.

8. The valve according to claim 2,
wherein the elastic member is formed in an annular shape.

9. The valve according to claim 8,
wherein the elastic member is a wave washer.

10. The valve according to claim 3,
wherein the elastic member is formed in an annular shape.

11. The valve according to claim 10,
wherein the elastic member is a wave washer.

* * * * *